July 10, 1928.

W. S. L. ULRICH

TRACTOR

Filed Nov. 24, 1923

Inventor
William S. L. Ulrich
By Churchill Parker Carlson
Attys

Witness:
John E. Titus

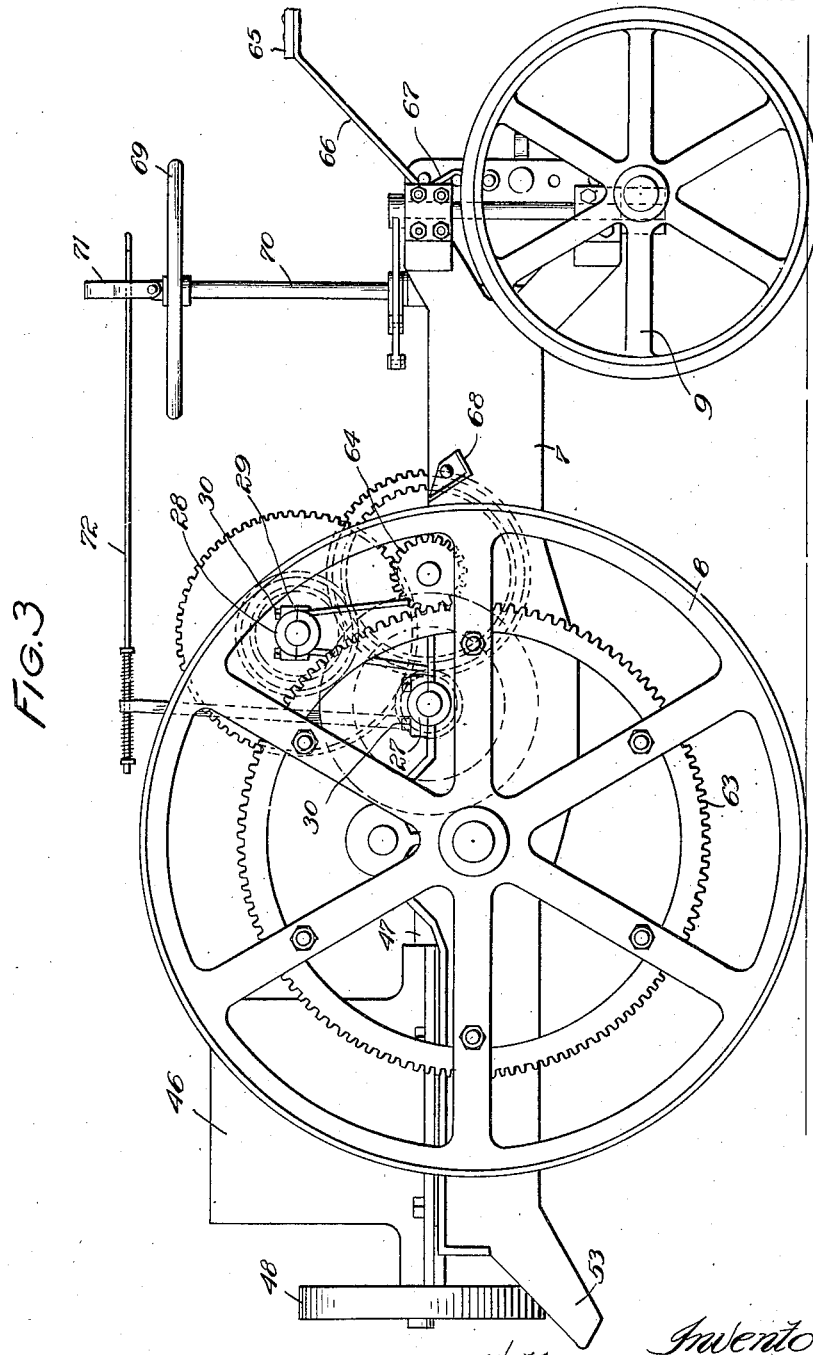

July 10, 1928.
W. S. L. ULRICH
TRACTOR
Filed Nov. 24, 1923
1,676,622
3 Sheets-Sheet 3
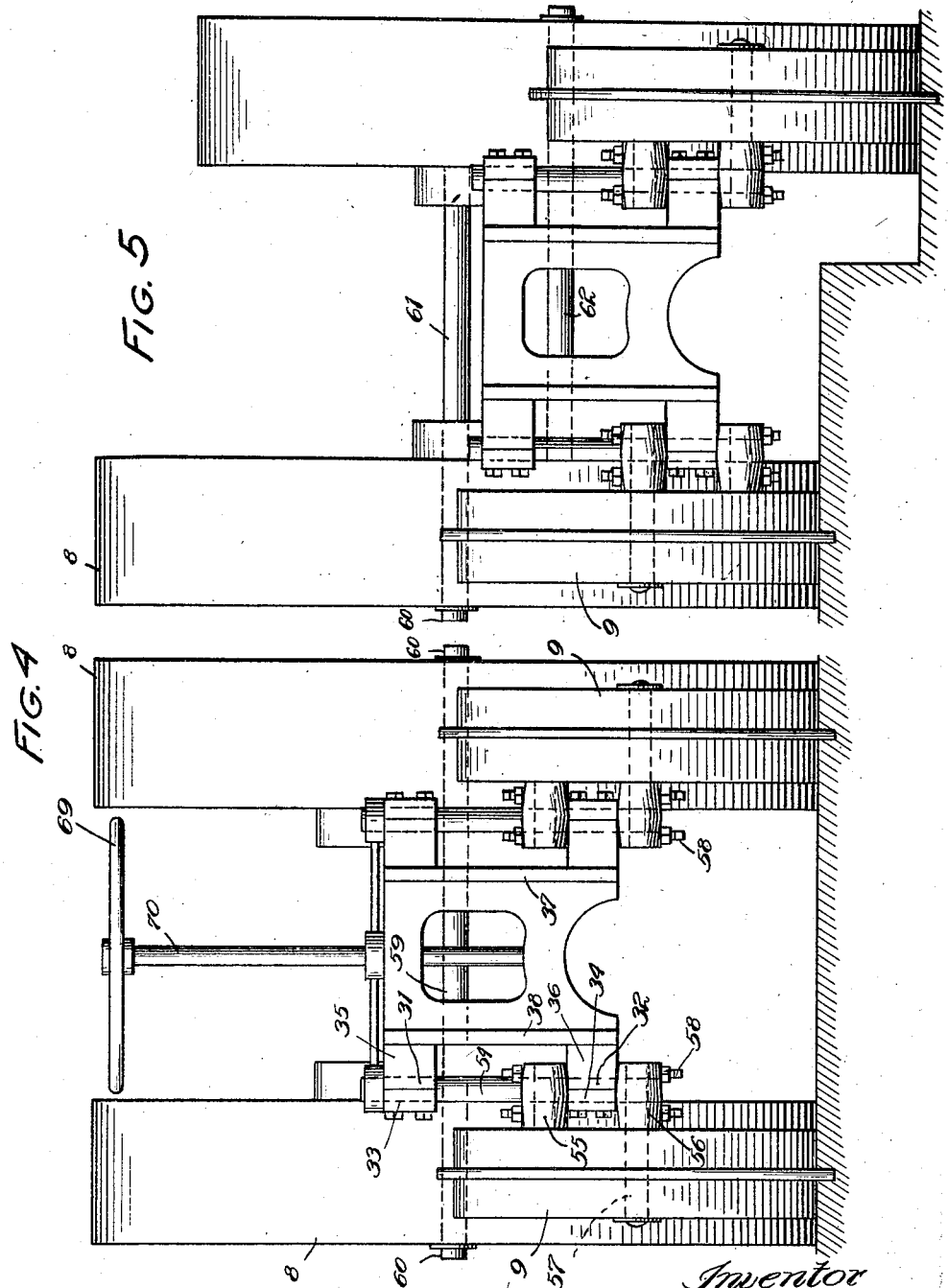

Patented July 10, 1928.

1,676,622

UNITED STATES PATENT OFFICE.

WILLIAM S. L. ULRICH, OF GRAFTON, ILLINOIS.

TRACTOR.

Application filed November 24, 1923. Serial No. 676,810.

This invention relates generally to tractors for agricultural purposes and more particularly to an improved frame for such tractors.

Among the tractor frames heretofore proposed, single castings have been used and designed to embody component parts of the motor and transmission mechanism. All of this requires machining of heavy castings which is costly and relatively slow to be accomplished. I have so designed my frame that it is likewise a single casting, requiring practically no machine work to complete it.

In my tractor the bearings for the machine parts are cast integrally with the frame so that all the machine work required on the casting will be the finishing, drilling and tapping for bearing caps, the bearings being cast sufficiently large to be babbitted directly.

Another object of my invention is to cast integrally with the frame a foot extending toward the ground at the overhanging end of the frame to prevent upsetting of the tractor in abnormal circumstances.

It has been a custom in some instances to provide tractors of this general class with means to change the wheel level of the tractors. Various accessory parts are entailed in the constructions heretofore used to accomplish this. In my invention I dispense with these parts and provide my tractor with a double deck of bearings all around for the supporting wheels and so arrange them that the wheels on both or either side of the tractor may be moved from one level to the other.

In order to accommodate my tractor at the different levels to haul various other vehicles, I provide a hitching device of novel and simple construction giving a substantial area at the end of the tractor where hitching means may be readily attached.

In the accompanying drawing I have illustrated one form of tractor embodying my invention. The location and the interrelation of all the various parts are not essential to the invention, but are so chosen that the frame illustrated is suitable for use with the transmission mechanism illustrated in my copending application Serial No. 676,- 811, filing date November 24, 1923, parts of which are included in these drawings.

Fig. 3 is a side view of a tractor at high level.

Fig. 4 is a view of the tractor looking toward the rear end, the tractor being set at high level, and the hitching device being omitted.

Fig. 5 is similar to Fig. 4 showing one side of the tractor moved to low level with the high level side running in a furrow.

Figure 1:
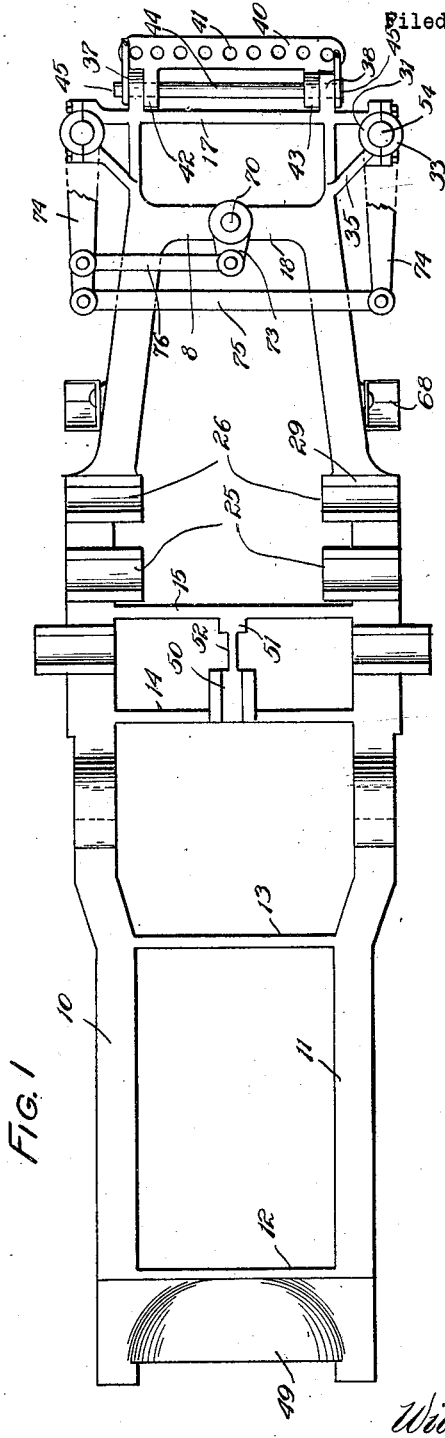
Fig. 1 is a plan view of the tractor frame with the hitching device attached.
Figure 2:
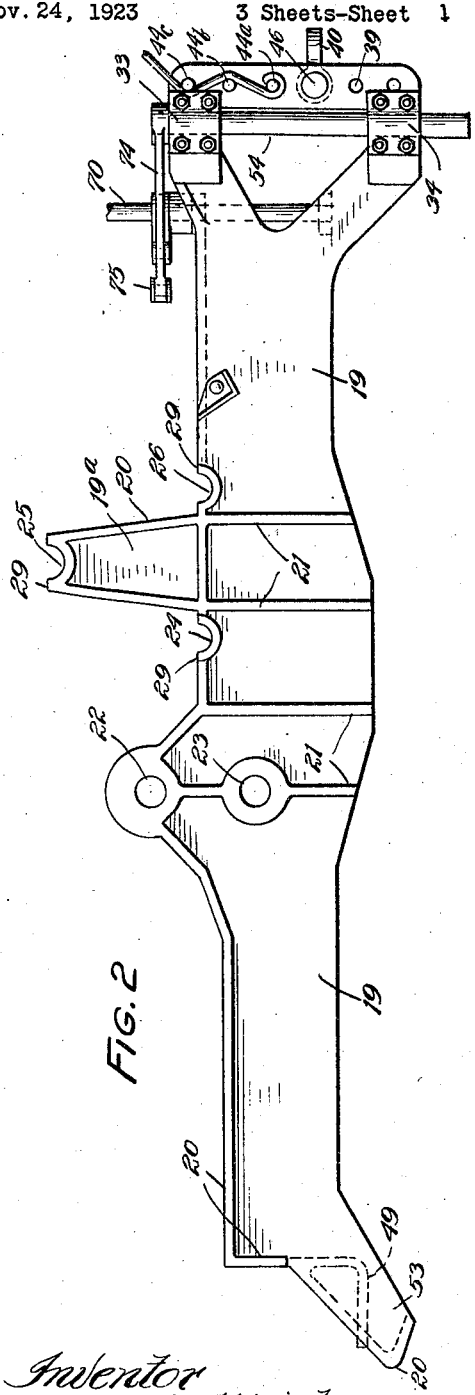
Fig. 2 is a side view of the frame of Fig. 1.

The tractor illustrated in the drawings comprises generally a unitary frame 7, a pair of driving wheels 8 and a pair of guide wheels 9 with suitable mechanism for driving and steering the tractor.

The frame proper 7 consists of two longitudinal members as 10 and 11 with a plurality of cross webs such as 12—13—14—15 and 17 and a cross beam 18 preferably made stronger than the other webs. The frame is a unitary cast piece and therefore I so construct its parts to facilitate the casting. To this end the various parts of the frame are webs or angular shaped pieces. The longitudinal members 10 and 11 have vertical side plates 19 and flange portions 20 preferably disposed at the top of the frame. Vertically to reinforce the members 10 and 11 suitable vertical webs 21 are placed along the plates under the flange where additional strength may be required.

Substantially at the center of the frame there are bearings to receive the driving wheels 8 arranged to be at different levels. Two such bearings are here used and they are vertically disposed as shown at 22 and 23. These bearings are cast with the frame and are sufficiently large so that they may be babbitted directly without machine work. Other bearings may be similarly cast in the frame in a like manner, as required for the mechanism. In the frame shown they are located in the flange 20 at each side of the frame. To complete the bearings suitable caps are bolted to the frame. In the present instance these bearings are for the driving mechanism of the tractor and are three in number 24, 25 and 26, one of these being located at a point which is the center of a circle having the driving wheel bearings in its periphery. In the present instance this happens to be located in a line which is the perpendicular bisector of the line joining the wheel bearings 22 and 23, the reason for which will appear hereinafter. For the mechanism employed the bearing 25 needs to be higher than the remaining portions of the frame so that for this purpose the side plate 19 is extended upwardly as at 19ª, the flange 20 being continued around the same. In Fig. 3 the bearing caps are shown in place as 27 and 28 for bearings 24 and 25 respectively. The surfaces 29 at each split bearing on the frame and the bearing caps are preferably machined and the frame drilled and tapped for the bolts 30 to secure the caps. The preparation of the frame for these caps is practically all the machine work required on the frame, barring the drilling of holes for purposes of assembling the tractor with its mechanism secured to the frame.

One end of the tractor is supported by the steering or guide wheels 9. In the present instance these are the rear wheels, so that this end of the frame is designed for the steering mechanism and for the attachment of a hauling device. Similar to the bearings 24, 25 and 26 on the top of the frame, there are provided other bearings 31 and 32 on the side of each longitudinal member. These bearings are alined vertically and similarly constructed to receive bearing caps 33 and 34. At this end the frame narrows down and the members 10 and 11 approach each other. Therefore bracket members 35 and 36 extend horizontally from the frame to carry the bearings 31 and 32 outwardly.

The hitch device which I have provided for my tractor is made variably adjustable to afford a multitude of locations where hitching means may be attached. Extending rearwardly from the web plate 17 are parallel vertical flanges 37 and 38 having corresponding sets of holes 39 vertically therein. Separate from the frame is a hitch bar 40 having a series of holes 41 therein and two ears or lugs 42 and 43 thereon with coaxial holes directed with the length of the bar. A clevis bolt 44 is used to secure the hitch bar to the frame, the lugs on the hitch bar being adapted to register with the vertical holes in the ears 37 and 38. A pin 45 and a head 45ª on the bolt 44 maintain the bolt against withdrawal. It is obvious that by this arrangement an extremely large number of locations for the holes 41 can be chosen for hitching purposes.

The front end of the frame is unsupported and carries the motor generally designated as 46. The motor has a shaft 47 alined with the length of the tractor. The forward end of the shaft has a fly wheel 48. In accordance with the type of motor and mechanism employed certain minor parts are added to the frame. In the present instance the plate 49 is a fly wheel guard. Similarly a bearing 50 is added to support the power shaft 47 at the inner end, a block 51 being placed for certain parts of the mechanism, with a cross web 52 for reinforcement under the bearing 50.

In the tractor shown, it is obvious that on using the power for reversal of the tractor there is a tendency under certain conditions for it to tilt, the forward end going down. To guard against this, projecting means are cast integrally with the frame to stop it in its downward course. The feet 53 show the form employed in the tractor described, the fly-wheel guard 49 serving also the same purpose as well as protecting the fly-wheel from injury which would result from unobstructed tilting. The flange 20 on the top of the frame members is extended along the foot as a part thereof.

The steering mechanism of my tractor is adapted to permit the raising and lowering of the guide wheels 9 according to the positions of the corresponding driving wheels 8. In the same manner in which I have provided two bearings in the frame for the driving wheels, I provide two bearings for the guide wheels. In the bearings 33 and 34 of the frame is placed a vertical shaft 54 on each side of the frame. This shaft has knuckles 55 and 56 secured to it and preferably integral therewith, so spaced apart that they are separated by the bearing 34 which thereby holds the shaft 54 vertically fixed. In spacing the knuckles 55 and 56 care should be taken, if the tractor is to be level, that they are the same distance apart as the bearings 22 and 23 for the driving wheels, as is shown on Fig. 5.

In providing axles or spindles for the wheels of the tractor any common means may be used. For the guide wheels the spindles 57 are used which are interchangeable between steering knuckles 55 and 56 by suitable means. In the present instance these spindles are secured in the knuckles by set screws 58. The driving wheels are similarly secured in their bearings, but in this instance the drive wheel axle extends across the center of the frame and is supported in both sides of the frame. In the position shown in Fig. 4 one axle similar to 59 is sufficient, serving at both ends to bear a drive wheel, the latter being secured thereto by the nut 60. However, in the position shown in Fig. 5 two single ended axles 61 and 62 are required, one for each level. The axles 59, 61 and 62 are fixed in the bearings by suitable set screws, the wheels turning freely on the ends thereof.

The operating mechanism for the wheels of my tractor may be varied. However, in the mechanism I provide means for transmitting power therefrom directly to the wheels rather than through the axle. On each drive wheel 8 I provide a bull ring gear 63 and in the mechanism a pinion gear 64 adapted to mesh therewith. The gear 64 is carried on a shaft in the bearing which I have described as lying in the center of the circular locus of the drive wheel bearings, in this instance bearing 26 of the frame. With this arrangement it is readily seen that the pinion 64 may mesh with the driving wheels with both in the same position or in different positions.

The tractor is provided with suitable accommodations for the operator to control the mechanism and to steer the tractor. I have shown a seat 65 for the operator which may be of the usual type found in such agricultural devices. To support the seat I have provided means to do so at varying heights to suit the special requirement of the operator. The seat is supported on one or more rigid bars 66 extending rearwardly from the tractor. The forward end 67 of the support is bent into a zig-zag shape to conform to the location of holes 39 in the flanges 37 and 38 on the frame. Other bolts similar to 44 are used as 44ª, 44ᵇ and 44ᶜ to secure the bars 66 in place. The bars 66 are preferably placed opposite to the postion chosen for the lugs 43 of the hitch bar so that the position of the seat and hitch bar do not interfere. A foot rest is appropriately secured to the frame members 10 and 11. This may be of any desired form, but I show a semi-box-like rest 68 bolted through each frame side member.

The steering wheel 69 is on a vertical shaft 70 suitably mounted in the frame through the cross beam 18. A swivel socket 71 on top of the wheel receives and secures the power control rod 72 in any suitable manner.

The steering shaft 70 is provided with any well known means for transmitting its motion to the guide wheels. Herein is shown a rigid arm 73 on the shaft 70 just above the frame. The shafts 54 holding the guide wheels have parallel rigid arms 74 linked by a member 75. From the arm 73 to either arm 74, a link 76 is provided parallel to the link 75.

In the above description of the exemplary embodiment of my invention, I do not limit the invention to the exact arrangements shown, but aim to include all modifications and embodiments of my invention which are comprehended in the appended claims.

I claim as my invention:

1. In a tractor having driving mechanism, driving wheels and a guide wheel mechanism, a unitary frame comprising a single casting having two longitudinal side members and a plurality of cross web members, a foot adapted to project downwardly at one end of the frame, a plurality of sets of bearings cast integral with the frame, one set being disposed at the end opposite the foot for the support of the guide wheel mechanism, other sets being disposed at different levels centrally of the frame for the driving wheels, and the remaining sets of bearings being arranged and adapted for the driving mechanism.

2. A tractor having, in combination, a frame, two vertically spaced sets of horizontally alined bearings formed in said frame, a pair of supporting wheels for said frame, each of said wheels being adapted to be selectively mounted in either of the two bearings on one side of said frame, and drive means for said wheels, said drive means being adapted to drive each wheel in either of its selective positions.

3. A tractor having, in combination, a frame, a driving wheel on each side of the frame, an axle for each wheel journaled therein, bearings on each side of the tractor for each axle similarly arranged on opposite sides so as to be in alinement, each axle being adapted to be supported in alined bearings, a driving shaft, a bull gear on each driving wheel, and a pinion on each end of the driving shaft for the respective bull gear, the shaft being a center about which the axle bearings are alined.

4. A tractor having a frame, a driving wheel on each side of the frame, an axle for each driving wheel, two bearings on each side of the tractor at different levels vertically, the bearings on opposite sides being in horizontal alinement, a bull gear on each driving wheel, a driving shaft in the tractor, and pinions on each end of the driving shaft adapted to mesh with the bull gears, the shaft being located in the mid-plane of the two horizontally alined sets of bearings, whereby the driving shaft pinions engage the bull gears, irrespective of the location of the driving wheels in their bearings.

5. A tractor having, in combination, a frame, bearings on said frame arranged at different levels for the driving wheels, guide wheels, a guide wheel supporting mechanism comprising vertically alined bearings on each side of the frame, a steering shaft in each set of alined bearings, knuckles on said shafts rigid therewith having horizontal openings therein, guide wheel spindles adapted to fit said openings, and retaining means to secure the spindles in said openings, the knuckles being similarly arranged on each side of the tractor to locate the guide wheels at different levels.

6. A tractor having, in combination, a frame, driving wheels, guide wheels, bearings in the frame arranged at different levels for the driving wheels, a guide wheel mechanism comprising, in combination, vertically alined bearings on each side of the tractor frame, a steering shaft in each set of bearings, two spaced knuckles on each shaft, one of said bearings being in the space between the knuckles whereby the shaft is vertically supported in the bearings, each of said knuckles having horizontal openings therein, guide wheel spindles for said openings, and means to secure the spindles in the openings, the knuckles being similarly arranged on each side of the tractor whereby the tractor may be maintained level when the guide wheels are similarly arranged on the knuckles.

7. A tractor having, in combination, a frame, driving mechanism on the frame, driving wheels and guide wheels to support the frame, bearings in the frame for the driving wheels, said bearings being horizontally alined at different levels vertically, axles for the driving wheels adapted to be set in the bearings at different levels whereby the tractor can run level with one driving wheel in a furrow, a bull gear on each driving wheel, a driving shaft in the mechanism, driving pinions at each end thereof for the respective driving wheels, the driving shaft being the center about which the different levels of the bearings are located, whereby each wheel is positively driven irrespective of its position in the tractor, spindles for the guide wheels, and clamping sockets for said spindles arranged at different levels corresponding to the levels for the driving wheels.

8. A tractor having, in combination, a frame, bearings in the frame arranged at different levels, driving wheels for said bearings, guide wheels for the tractor, two pair of vertically alined brackets on the frame, bearings in said brackets, a shaft in each pair of bearings, knuckles on each of said shafts having horizontal clamping sockets therein at different levels corresponding to the levels for the driving wheels, and spindles for said sockets adapted to be clamped therein to support the guide wheels.

In testimony whereof, I have hereunto affixed my signature.

WILLIAM S. L. ULRICH.